(12) United States Patent
Keller et al.

(10) Patent No.: US 7,050,518 B1
(45) Date of Patent: May 23, 2006

(54) DATA TRANSMISSION METHOD

(75) Inventors: Manfred Keller, Sonnefeld (DE); Renke Bienert, Schönaich (DE); Ulrich Wursthorn, VS-Villingen (DE)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/806,210

(22) PCT Filed: Oct. 14, 1999

(86) PCT No.: PCT/EP99/07727

§ 371 (c)(1),
(2), (4) Date: Mar. 27, 2001

(87) PCT Pub. No.: WO00/24172

PCT Pub. Date: Apr. 27, 2000

(51) Int. Cl.
*H04L 7/00* (2006.01)

(52) U.S. Cl. .................. 375/354; 375/361; 375/369

(58) Field of Classification Search ............... 375/361, 375/282, 333, 354, 365, 370, 225, 259, 265, 375/295, 369
See application file for complete search history.

(56) References Cited

U.S. PATENT DOCUMENTS

| | | | | |
|---|---|---|---|---|
| 4,569,062 A | * | 2/1986 | Dellande et al. | 375/370 |
| 5,247,464 A | * | 9/1993 | Curtis | 379/25 |
| 5,323,398 A | * | 6/1994 | Wake et al. | 370/467 |
| 5,379,325 A | * | 1/1995 | Katayama et al. | 375/354 |
| 5,684,479 A | * | 11/1997 | Hayashi | 341/102 |
| 5,974,368 A | * | 10/1999 | Schepps et al. | 340/5.61 |
| 6,064,705 A | * | 5/2000 | Zalud et al. | 375/361 |
| 6,174,170 B1 | * | 1/2001 | Olmedo | 434/307 A |
| 6,266,710 B1 | * | 7/2001 | Dittmer et al. | 710/1 |
| 6,563,789 B1 | * | 5/2003 | Rasanen | 370/230 |

* cited by examiner

*Primary Examiner*—Emmanuel Bayard
(74) *Attorney, Agent, or Firm*—Gregory Ansems

(57) ABSTRACT

The invention relates to a method for the asynchronous serial data transmission between a transmitter and a receiver over a radio transmission link, whereby a synchronization data frame and a carrier recognition frame is arranged in front of the useful data frame. The data frames are each enframed at the beginning and end by a start bit and a stop bit at the beginning and end. The coding of all data frames results such that, in addition to the start and stop bits, an equal number of zero and one bits exists.

12 Claims, 1 Drawing Sheet

DATA TRANSMISSION METHOD

The present invention relates to a method for asynchronous serial data transmission as claimed in the preamble of patent claim 1.

In this context, it is known for a carrier identification and synchronization to be sent in advance of user data transmitted between a transmitter and a receiver. The carrier identification signals to the receiver that a message is being sent, and the synchronization is used to synchronize to the start of the user data, that is to say to the start bit preceding this user data.

The simplest form of transmitter and receiver synchronization is used for asynchronous transmission. The transmitter clock and the receiver clock in this case need be only at approximately the same frequency. The transmitted data words have a fixed format, and are also provided with a start bit and a stop bit. The receiver clock is synchronized to the negative edge of the start bit, and the other bits are sampled in the center of the bit time period.

Asynchronous data transmission can also be carried out with low-cost standard modules, such as those marketed by various manufacturers in the form of UARTs (Universal Asynchronous Receiver Transmitter). These have internal clocks whose time constancy is not subject to any particularly stringent requirements, since the clock is in each case resynchronized at the start of a character, that is to say in general after the transmission of 10. Thus, all that is necessary is for the stop bit still to be sampled during the bit period.

For data transmission, it is also important for the transmitting/receiving electronics to have a constant operating point, and for the operating point not to be shifted, for example, due to lengthy sequences of zeros or ones in the character coding. This could be ensured by using coding formats without any direct-current element, but in some cases these are too complex and cannot be evaluated by UARTs.

The object of the present invention is thus to specify a data transmission method which ensures that the transmitting/receiving electronics have a constant operating point, while using a simple coding format.

This object is achieved by the description features of patent claim 1. Further advantageous refinements of the method according to the invention can be found in the dependent claims.

The invention will be explained in more detail in the following text with reference to an exemplary embodiment which is shown in the figures of the attached drawing, in which.

Figure 1:
FIG. 1 shows the composition of the transmitted data stream.
Figure 2:
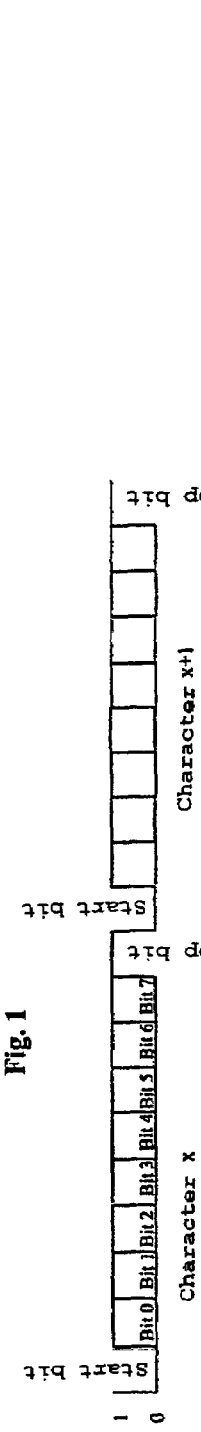
FIG. 2 shows the fundamental character coding.

As shown in FIG. 1, the bit stream used for the transmission method is composed, in a known manner, of a carrier identification, synchronization and the user data. Each part of this bit stream is composed, as shown in FIG. 2, of a character with a width of 10 bits, with the first bit being a start bit and the last bit being a stop bit. The start bit is represented by a "0", and the stop bit is represented by a "1". In between, there are eight information bits for the character.

Figure 3:
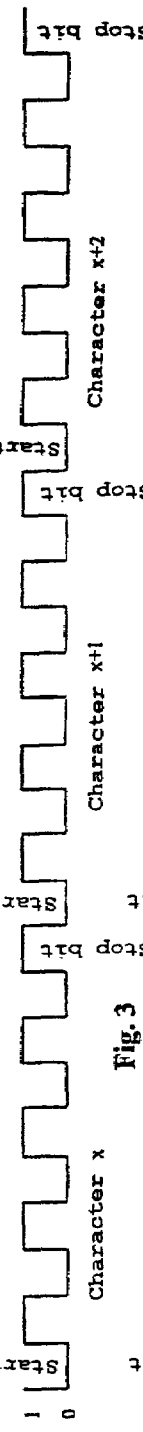
FIG. 3 shows the coding of the carrier identification.

As shown in FIG. 3, the carrier identification is coded based on the hexadecimal code 55, that is to say ones and zeros alternate with one another. The bit rate is, for example, 9 600 baud, which corresponds to a frequency of 4.8 kHz. The internal clock in the UART also operates at this bit rate or frequency for sampling the character bits.

Figure 4:
FIG. 4 shows the coding of the synchronization character.

As shown in FIG. 4, the synchronization character is coded using the hexadecimal code 33, that is to say two ones are in each case followed by two zeros etc. This code is symmetrical, as far as the number of ones and zeros is concerned, so that the direct-current level and the operating point of the receiving electronics do not change, on average, and with the frequency of 2.4 kHz still being sufficiently high for radio transmission. Furthermore, the synchronization character is chosen such that its bit pattern does not occur in the user data.

Figure 5:
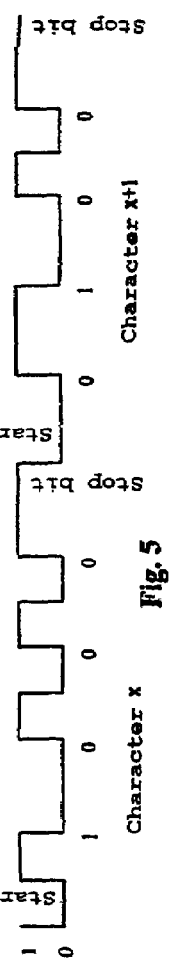
FIG. 5 shows the coding of the user data.

As shown in FIG. 5, the user data are coded using Manchester coding (bi-phase format), in which both the zeros and the ones are coded by pulses, although these occur at different times within a bit frame. For example, a one is represented by a square-wave pulse with half the step duration which is located in the first half of the time period available for representation of a bit. The same pulse is used to represent the zero, but in this case is located in the second half of the time period. The Manchester code thus ensures the transmission of clock information as well in the "0" and "1" sequences, and it is possible to distinguish between the transmission of a series of zeros and no transmission. Although the signal does have a direct-current component, its level is the same, however, on average.

Since each zero or one is coded by means of a pulse having half the step width of the carrier frequency of 4.8 kHz, a byte with 8 bits cannot be coded in one character; in fact, two characters each preceded by a start bit and followed by a stop bit are required to transmit one byte, which represents a special feature of the present invention.

For example, in the example illustrated in FIG. 5, the user data are coded in the hexadecimal code 21.

What is claimed is:

1. A method for asynchronous data transmission between a transmitter and receiver, the method comprising:
   transmitting, via a transmission path at a particular transmission bit rate, data in a user data frame preceded by a synchronization data frame and a carrier identification data frame, each data frame having a start bit and stop bit at the respective start and end of the frame;
   wherein the data frames are coded with an identical number of 0 and 1 bits, including the start and stop bits;
   wherein the carrier identification data is coded using the transmission bit rate;
   wherein the synchronization data is coded using half the transmission bit rate; and
   wherein the user data is coded using Manchester coding.

2. The method of claim 1, wherein the user data frame is coded using two half bytes comprising four Manchester-coded bits transmitted sequentially, with each half-byte being enclosed by a start bit and a stop bit at the respective start and end of the frame.

3. The method of claim 2, further comprising implementing at least one UART for processing 10-bit frames, each frame having a start bit, 8 data bits and a stop bit, with the frequency of the internal clock of the UART being matched to the bit rate of the carrier identification.

4. The method of claim 1, further comprising implementing at least one UART for processing 10-bit frames, each frame having a start bit, 8 data bits and a stop bit, with the frequency of the internal clock of the UART being matched to the bit rate of the carrier identification.

5. The method of claim 1, wherein the carrier identification is coded using a hexadecimal code 55 and wherein the synchronization data is coded based on the hexadecimal code 33.

6. A method for asynchronous data transmission between a transmitter and receiver at a transmission bit rate, the method comprising:

coding carrier identification data, using the transmission bit rate, in a carrier identification data frame including start and stop bits and having an identical number of 0 bits and 1 bits;

coding synchronization data, using half the transmission bit rate, in a synchronization data frame including start and stop bits and having an identical number of 0 bits and 1; bits;

coding user data, using Manchester coding, in a user data frame including start and stop bits and having an identical number of 0 and 1 bits, the user data coded into two half bytes comprising four Manchester-coded bits transmitted sequentially, with each half-byte having a start bit and a stop bit at the respective start and stop ends of the user data frame; and transmitting, via a transmission path at the transmission bit rate, the user data frame preceded by the synchronization data frame preceded by the carrier identification data frame.

7. The method of claim 6, transmitting includes transmitting bytes of data and wherein the transfer of each byte of data includes transferring two characters each preceded by a start bit and followed by a stop bit.

8. The method of claim 6, wherein transmitting includes transmitting asynchronous data.

9. A system for asynchronous data transmission between a transmitter and receiver at a transmission bit rate, the system comprising:

a data transmission link configured and arranged to pass data between a receiver and a transmitter arrangement;

a receiver; and a transmitter arrangement configured and arranged to:

code carrier identification data, using the transmission bit rate, into a carrier identification data frame including start and stop bits and having an identical number of 0 bits and 1 bits;

code synchronization data, using half the transmission bit rate, into a synchronization data frame including start and stop bits and having an identical number of 0 bits and 1 bits;

code user data, using Manchester coding, into a user data frame including start and stop bits and having an identical number of 0 bits and 1; and subsequently transmit to the receiver, via the data transmission link, the carrier identification data frame followed by the synchronization data frame, followed by the user data frame.

10. The system of claim 9, wherein the transmitter arrangement is configured and arranged to code user data using Manchester coding by coding the data with two half bytes comprising four Manchester-coded bits to be transmitted sequentially, with each half-byte having a start bit and a stop bit at the respective start and stop ends of a data frame including the coded user data.

11. The system of claim 9, wherein the transmitter arrangement is configured and arranged to transfer bytes of data by transferring two characters each preceded by a start bit and followed by a stop bit.

12. The system of claim 9, wherein the transmitter arrangement is configured and arranged to transmit the carrier identification data frame, the synchronization data frame and the user data frame to the receiver using asynchronous data transmission.

* * * * *